US012590694B2

(12) United States Patent
Hong

(10) Patent No.: US 12,590,694 B2
(45) Date of Patent: Mar. 31, 2026

(54) CONNECTING ASSEMBLY FOR DECORATIVE LIGHT

(71) Applicant: Guangdong Kuifa Trading Co., Ltd., Dongguan City (CN)

(72) Inventor: Kui Hong, Dongguan (CN)

( * ) Notice: Subject to any disclaimer, the term of this patent is extended or adjusted under 35 U.S.C. 154(b) by 0 days.

(21) Appl. No.: 19/011,739

(22) Filed: Jan. 7, 2025

(65) Prior Publication Data

US 2025/0146657 A1 May 8, 2025

(30) Foreign Application Priority Data

Jul. 13, 2024 (CN) ......................... 202421660080.9

(51) Int. Cl.
*F21V 23/06* (2006.01)

(52) U.S. Cl.
CPC .................................... *F21V 23/06* (2013.01)

(58) Field of Classification Search
CPC ..... F21V 23/06; F21S 2/00; F21S 4/15; F21S 4/10
See application file for complete search history.

(56) References Cited

FOREIGN PATENT DOCUMENTS

CA 2926794 A1 * 5/2014 ............. F21V 23/06

OTHER PUBLICATIONS

Innovation Q+ NPL (Year: 2025).*

* cited by examiner

*Primary Examiner* — Anabel Ton
(74) *Attorney, Agent, or Firm* — Daniel M. Cohn; Howard M. Cohn

(57) ABSTRACT

The utility model relates to the technical field of household appliances and discloses a connecting assembly for a decorative light, which comprises at least a connecting piece, at least a light string and at least a sleeve, wherein the connecting piece is provided with at least a connecting end, the connecting end is provided with at least a first connector, at least one end of the light string is provided with a second connector, the second connector is electrically connected with the first connector, wherein the sleeve is set on the corresponding light string and at least one end thereof is connected with the connecting end of the connecting piece, and the connecting assembly is assembled into a decorative pattern that can emit light after being powered on by means of assembly of the connecting piece, sleeve, and light string. By utilization of the utility model, the packaging/storage space of components is greatly saved, which is not only beneficial to reducing the packaging volume of products, improving the packing utilization rate during product transportation, but also saves the daily storage space, and is convenient for the storage and storage of users' articles; ensures that the product can be used repeatedly and normally, the product assembly is simpler and smoother, and the disassembly and assembly are easier and more convenient, thereby greatly shortening the time of product installation or disassembly.

4 Claims, 5 Drawing Sheets

CONNECTING ASSEMBLY FOR DECORATIVE LIGHT

TECHNICAL FIELD

The utility model relates to the technical field of decorative lighting, in particular to a connecting assembly for a modular decorative light which is convenient to disassemble and assemble.

BACKGROUND TECHNOLOGY

With the progress of society and the improvement of people's living standard, the role of lighting in the architectural environment is increasing day by day, and lighting design has become an important part of architectural design; lighting is no longer simply about lighting up the light in the traditional sense, but about using the special "language" of lighting to create a pleasing artistic atmosphere. This type of lighting, called decorative lighting, also known as atmospheric lighting, adds atmosphere to the environment through some color and dynamic changes based on basic lighting.

In the traditional decorative lighting, there is an assembled structure decorative lighting, which is assembled by the basic parts constituting the decorative pattern, and at the time or after the assembling, the decorative light string is arranged in the basic parts to cover the whole decorative pattern. When the light string is powered on, the light of the light string is emitted from each position of the decorative pattern to realize the luminous effect of the whole decorative pattern. Moreover, these light strings can realize the switching of different luminous modes under the regulation of the controller, and users can adjust the luminous modes according to requirements of the environmental atmosphere.

However, this type of decorative lighting, when laying light strings on decorative patterns, generally adopts a single light string to continuously thread all positions of decorative patterns, which requires reserving light strings whose length is at least the same as the total length of decorative patterns, so that the overall reserved length of light strings is longer, which makes it easy for the light strings to be knotted and poorly threaded in the process of laying light strings on basic components of decorative patterns during product assembly, thus increasing the difficulty of product assembly; moreover, when the product needs to be stored, due to that the light string is long, the light string needs to be wound (using a wire reel) or folded in half repeatedly to compress the storage volume of the light string and fix it before it can be stored. The storage process is cumbersome; and if the storage and fixation are improper, the light strings will be scattered, which will easily lead to the entanglement of the light strings or even knotting may occur, which will affect the secondary use of the product and cause inconvenience to users.

SUMMARY OF THE INVENTION

The purpose of the utility model is to overcome the shortcomings in the prior art and provide a connecting assembly for a decorative light. By utilization of the utility model, the packaging/storage space of components is greatly saved, which is not only beneficial to reducing the packaging volume of products, improving the packing utilization rate during product transportation, but also saves the daily storage space, and is convenient for the storage and storage of users' articles; it can also effectively avoid entanglement or knotting of light strings, ensures that the product can be used repeatedly and normally, the product assembly is simpler and smoother, and the disassembly and assembly are easier and more convenient, thereby greatly shortening the time of product installation or disassembly.

In order to achieve the above purpose, the utility model adopts the following technical scheme:

The invention relates to a connecting assembly for a decorative light, which comprises at least a connecting piece, at least a light string and at least a sleeve, wherein the connecting piece is provided with at least a connecting end, the connecting end is provided with at least a first connector, at least one end of the light string is provided with a second connector, the second connector is electrically connected with the first connector, wherein the sleeve is set on the corresponding light string and at least one end thereof is connected with the connecting end of the connecting piece, and the connecting assembly is assembled into a decorative pattern that can emit light after being powered on by means of assembly of the connecting piece, sleeve, and light string.

Wherein the connecting piece is a cavity structure. When the connecting piece is provided with more than two connecting ends, the connecting ends are communicated with each other, the connecting ends are provided with at least a mounting base, the mounting base is connected with at least one first connector, and when the connecting piece is provided with more than two first connectors, the first connectors are electrically connected with each other.

When the connecting piece is provided with two connecting ends, the two connecting ends are arranged in a linear structure, or a zigzag structure, or set in an angle structure; alternatively, when the connecting piece is provided with more than three connecting ends, each of the connecting ends is arranged in a planar radial structure or in a spatial radial structure.

Wherein an outer surface of the connecting end of the connecting piece is provided with an anti-slip pattern, and the anti-slip pattern is used to assist the stable connection between the connecting end and the sleeve.

When the first connector is a male base structure, the second connector is a female base structure mated to the first connector, or when the first connector is a female base structure, the second connector is a male base structure mated to the first connector.

Wherein one end of the sleeve which is not connected with the connecting piece is provided with a plug, and at least an auxiliary connecting part is arranged in the plug, and the auxiliary connecting part is used for connecting one end of the light string which is not connected with the first connector.

The utility model has the beneficial effects that the first connector thereof is arranged at the connecting end of the connecting piece, and when two or more first connectors are arranged in the same connecting piece, the first connectors are electrically connected, so that the connecting piece and the first connectors constitute a mounting component which is characterized by the electrical connection; At least one end of each light string thereof is provided with a second connector, and the second connector is connected with the corresponding first connector on the connecting piece, so that each light string can be electrically connected with each other after being connected to each connecting piece, and at the same time, the light string and the connecting piece can be quickly disassembled and assembled, thus providing convenience for users to use and store daily; The sleeve setting on each light string can protect the light string and the first connector on each connecting piece, and each sleeve is connected with each connecting piece by matching the staple bolts, which not only ensures the stability of the connection between the sleeve and the connecting piece, but also facilitates the disassembly between the sleeve and the connecting piece during subsequent storage; and the connecting end of the connecting piece is also provided with an anti-slip pattern to improve the stability of the connection between the sleeve and the connecting piece; In addition, the setting of a plug on the end of the sleeve that is not connected to the connecting piece can fix the end of the light string that is not connected to the first connector, thus avoiding one end of the light string from slipping to the other end of the sleeve due to being not fixed, which affects the luminous decoration effect of the present utility model. At the same time, the setting of the plug can also reduce the entry of dust or particles into the sleeve, so as to ensure the normal working effect of the light string; Through the utility model, the connecting piece, the light string, the sleeve and the plug are modularized, so that the packaging/storage space of components is greatly saved, which is not only beneficial to reducing the packaging volume of products, improving the packing utilization rate during product transportation, but also saves the daily storage space, and is convenient for the storage and storage of users' articles; moreover, the modularized setting of the utility model can effectively avoid tangling or knotting of the light string, so as to ensures that the product can be used repeatedly and normally, the product assembly is simpler and smoother, and the disassembly and assembly are easier and more convenient, thereby greatly shortening the time of product installation or disassembly

DESCRIPTION OF THE DRAWINGS

Figure 1:
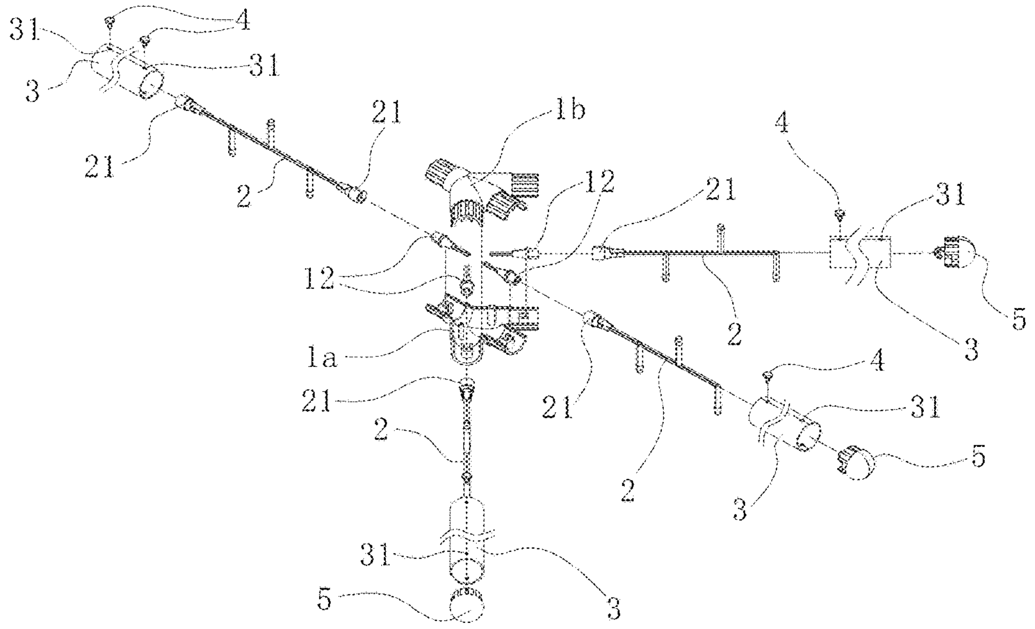
FIG. 1 is a schematic diagram of the explosive structure of the utility model.

1—Connecting piece; 11—Connecting end; 12—First connector; 13—Mounting base; 1*a*—First assembled part; 1*aa*—first assembled end; 1*aaa*—First groove; 1*aab*—First flange; 1*ab*—First assembled base; 1*aba*—First mounting groove; 1*b*—Second assembled part; 1*ba*—Second assembled end; 1*baa*—Second groove; 1*bab*—Second flange; 1*bb*—Second assembled base; 1*bba*—Second mounting groove; 1*c*—Auxiliary components; 1*ca*—Male connecting part; 1*cb*—Female connecting part; 1*d*—Anti-slip pattern; 1*e*—First fixing hole; 2—Light string; 21—Second connector; 3—Sleeve; 31—Mounting hole; 4—Staple bolt; 5—Plug; 51—Auxiliary connecting part

DETAILED DESCRIPTION OF THE EMBODIMENTS

The utility model will be further described below with reference to the figure of the description:

As shown in FIGS. 1-10, the present utility model relates to a connecting assembly for a decorative light, which comprises at least a connecting piece 1, at least a light string 2, and at least a sleeve 3. The connecting piece 1 is provided with at least one connecting end 11, the connecting end 11 is provided with at least a first connector 12, at least one end of the light string 2 is provided with a second connector 21, the second connector 21 is electrically connected to the first connector 12. wherein the sleeve 3 is set on the corresponding light string 2 and at least one end thereof is connected with the connecting end 11 of the connecting piece 1, and the connecting assembly is assembled into a decorative pattern that can emit light after being powered on by means of assembly of the connecting piece 1, sleeve 3, and light string 2.

As shown in FIGS. 1-8, the connecting piece 1 is a cavity structure. When the connecting piece 1 is provided with more than two connecting ends 11, the connecting ends 11 are communicated with each other, the connecting ends 11 are provided with at least a mounting base 13, the mounting base 13 is connected with at least one first connector 12, and when the connecting piece 1 is provided with more than two first connectors 12, the first connectors 12 are electrically connected with each other.

Figure 3:
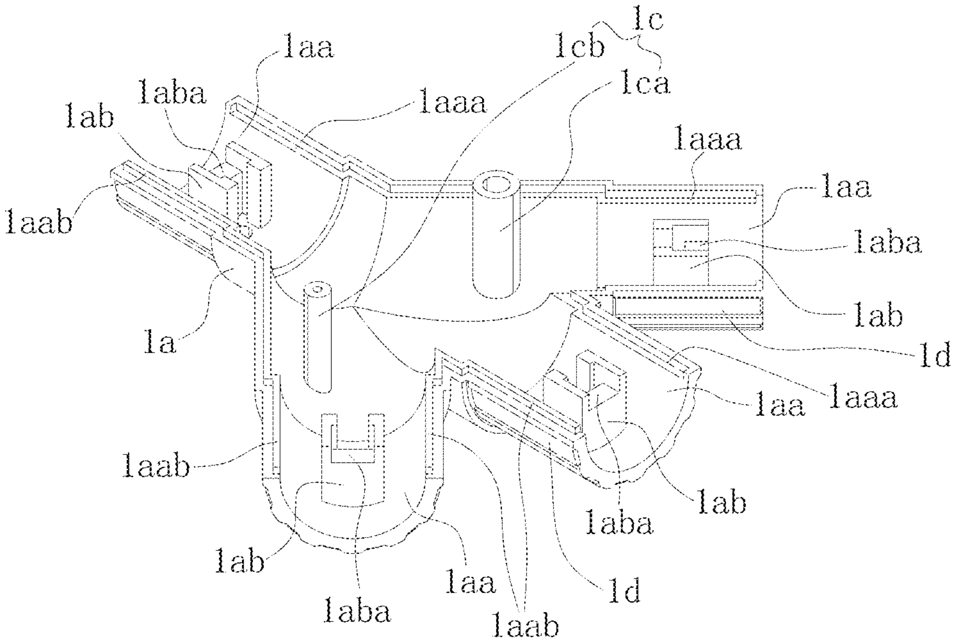
FIG. 3 is a schematic diagram of a first assembled part structure of one embodiment of the connecting piece of the utility model.
Figure 4:
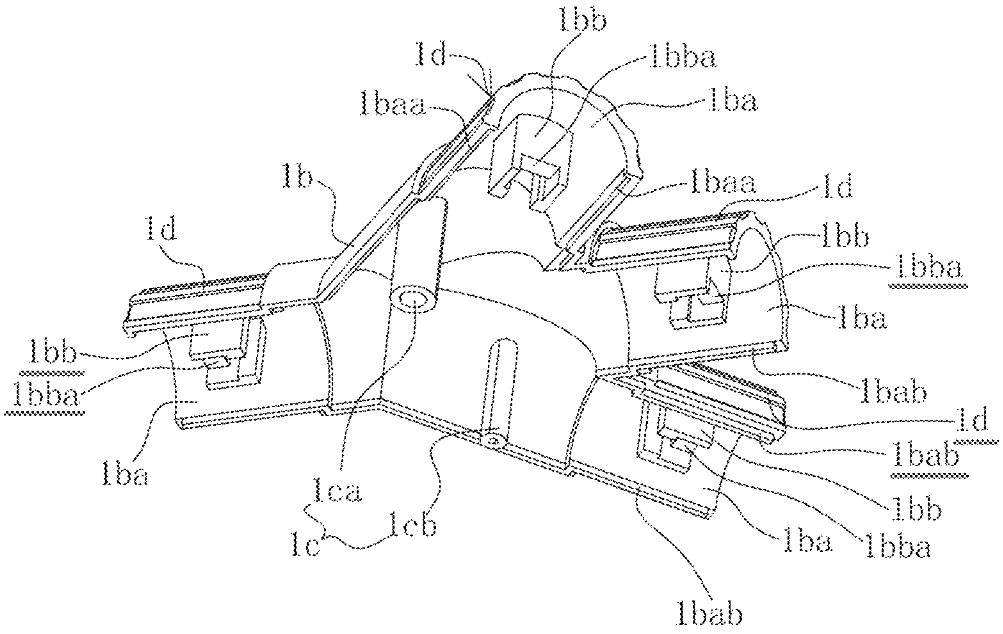
FIG. 4 is a schematic diagram of bottom view structure of a second assembled part of one embodiment of the connecting piece of the utility model.
Figure 5:
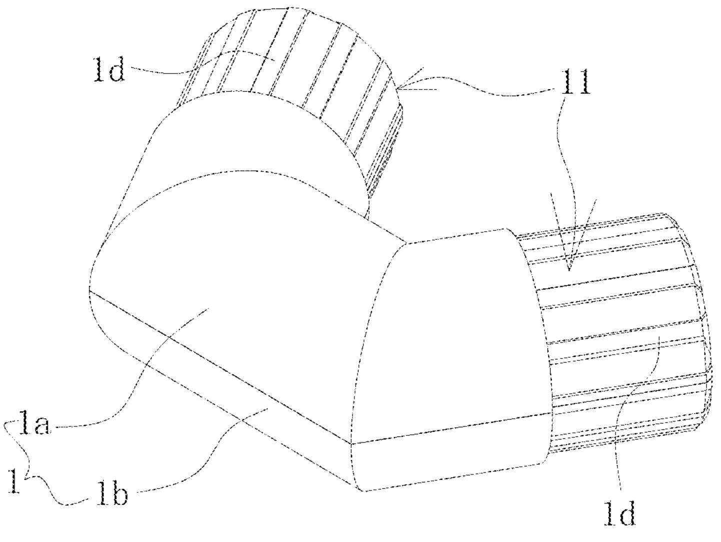
FIG. 5 is a schematic diagram of the second embodiment structure of the connecting piece of the utility model.
Figure 6:
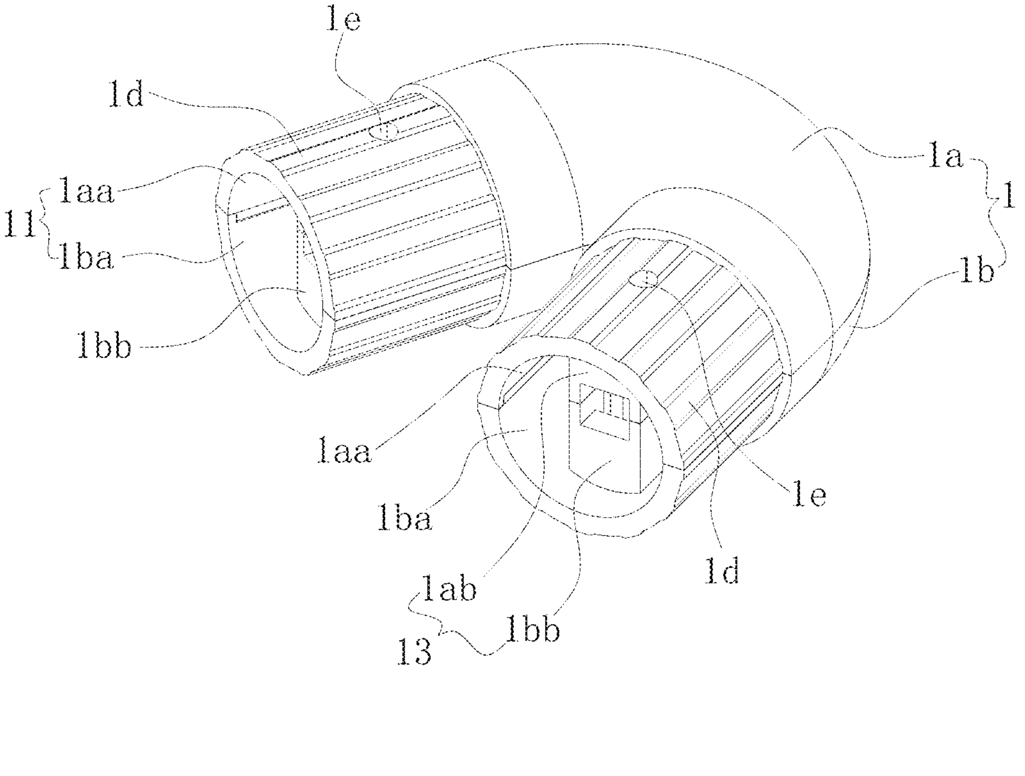
FIG. 6 is a schematic diagram of the third embodiment structure of the connecting piece of the utility model.
Figure 7:
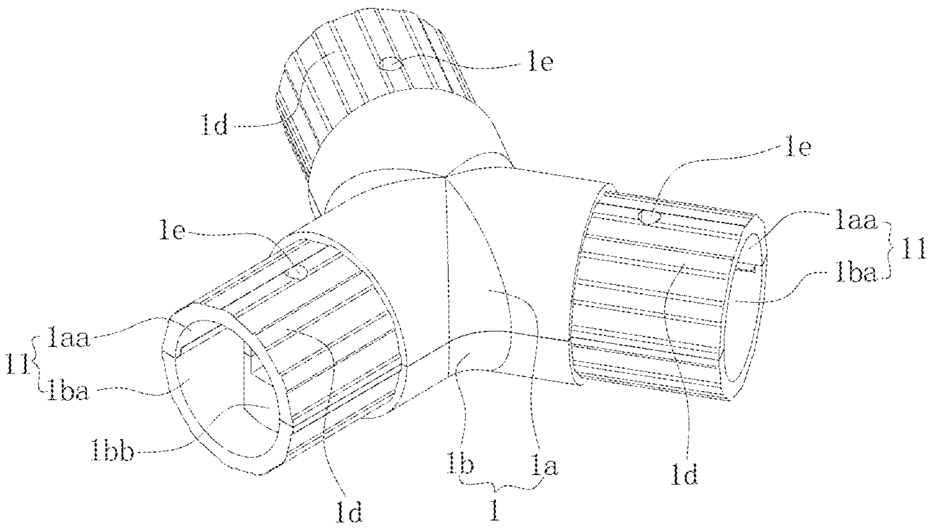
FIG. 7 is a schematic diagram of a fourth embodiment structure of the connecting piece of the utility model.
Figure 8:
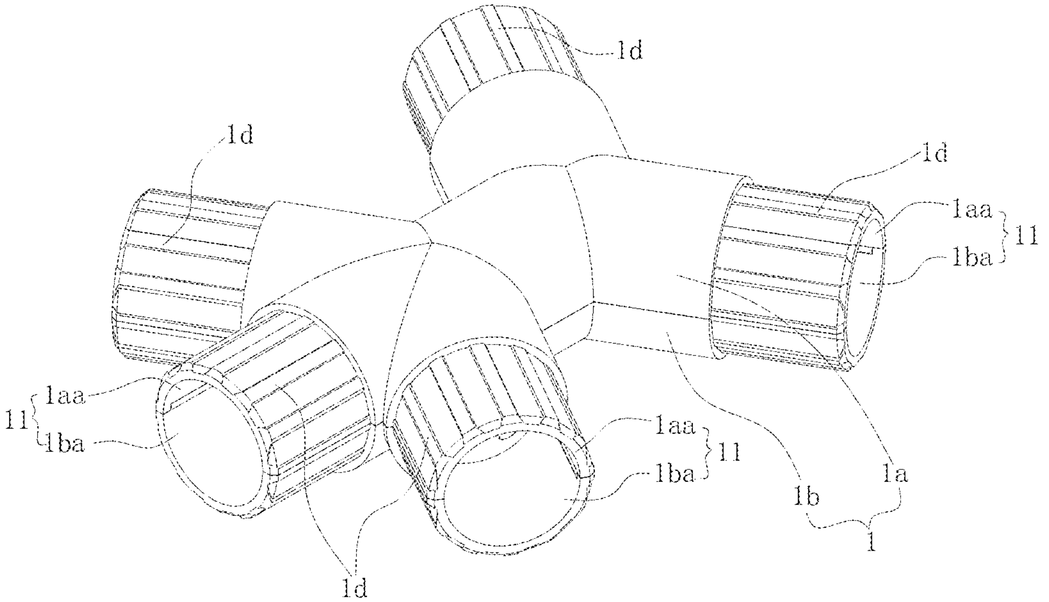
FIG. 8 is a schematic diagram of the fifth embodiment structure of the connecting piece of the utility model

Furthermore, as shown in FIGS. 3 and 4, the connecting piece 1 is composed of a first assembled part 1*a* and a second assembled part 1*b* snap-fit to the first assembled part 1*a*. The first assembled part 1*a* is provided with at least one first assembled end 1*aa*, one side of the first assembled end 1*aa* is provided with a first groove 1*aaa*, the other side of first assembled end 1*aa* is provided with a first flange 1*aab*, and the second assembled part 1*b* is provided with at least one second assembled end 1*ba*, one side of the second assembled end 1*ba* is provided with a second groove 1*baa*, and the other side of the second assembled end 1*ba* is provided with a second flange 1*bab*. The first groove 1*aaa* is assembled with the second flange 1*bab*, and the first flange 1*aab* is assembled with the second groove 1*baa* to achieve the snap-fit of the first assembled end 1*aa* of the first assembled part 1*a* and the second assembled end 1*ba* of the second assembled part 1*b*, so that the first assembled end 1*aa* and the second assembled end 1*ba* form a connecting end 11.

As shown in FIGS. 3 and 4, in order to strengthen the connection between the first assembled part 1*a* and the second assembled part 1*b*, at least an auxiliary component 1*c* is provided between the first assembled part 1*a* and the second assembled part 1*b* respectively, and the stability of the connection between the first assembled part 1*a* and the second assembled part 1*b* is improved by the auxiliary component 1*c*. The auxiliary assembly 1*c* comprises a male connecting part 1*ca* and a female connecting part 1*cb* sleeved on the male connecting part 1*ca*. When there is only one group of the auxiliary assembly 1*c*, the male connecting part 1*ca* and the female connecting part 1*cb* of the auxiliary assembly 1*c* can be respectively arranged inside the first assembled part 1*a* or the second assembled part 1*b* according to the requirements of the product structure design, and are integrally formed with the first assembled part 1*a* or the second assembled part 1*b* respectively.

As shown in FIGS. 3 and 4, when there are two groups of auxiliary component 1*c*, it is preferable to simultaneously place one male connecting part 1*ca* and one female connecting part 1*cb* of the two groups of auxiliary components 1*c* in the first assembled part 1*a*, and correspondingly place the other male connecting part 1*ca* and the other female connecting part 1*cb* of auxiliary components 1*c* in the second assembled part 1*b*. By virtue of the male connecting part 1*ca* of the first assembled part 1*a* connecting to the female connecting part 1*cb* of the second assembled part 1*b*, and the female connecting part 1*cb* of the first assembled part 1*a* connecting to the male connecting part 1*ca* of the second assembled part 1*b*, to further assist in strengthening the connection between the first assembled part 1*a* and the second assembled part 1*b*. Alternatively, the male connecting part 1 *ca*/female connecting part 1 *cb* are both provided in the first assembled part 1*a*, and the female connecting part 1*cb*/male connecting part 1 *ca* are both provided in the second assembled part 1*b* to assist in strengthening the connection between the first assembled part 1*a* and the second assembled part 1*b*; Whether the male connecting part 1*ca* and the female connecting part 1*cb* of the auxiliary assembly 1*c* are specifically provided in the first assembled part 1*a* or the second assembled part 1*b* is to assist in strengthening the connection between the first assembled part 1*a* and the second assembled part 1*b*, and can be selected according to the actual design requirements of the product structure, and there is not self limitation herein.

Furthermore, as shown in FIGS. 3 and 4, the first assembled end 1*aa* of the first assembled part 1*a* is provided with at least one first assembled base 1*ab*, which is provided with at least one first installation groove 1*aba*. The second assembled end 1*ba* of the second assembled part 1*b* is provided with at least one second assembled base 1*bb*, which is provided with at least one second installation groove 1*bba*. The first assembled base 1*ab* and the second assembled base 1*bb* are connected to form a mounting base 13; When the first assembled part 1*a* and the second assembled part 1*b* are snapped fit into each other, the first mounting groove 1*aba* of the first assembled base 1*ab* and the second mounting groove 1*bba* of the second assembled base 1*bb* form a mounting cavity for mounting the first connector 12, and the first connector 12 can be more stably connected to the connecting piece 1 by fitting the first mounting groove 1*aba* and the second mounting groove 1*bba*. As shown in FIGS. 1-6, when the connecting piece 1 is provided with two connecting ends 11, the two connecting ends 11 are arranged in a linear structure, or a zigzag structure, or set to an angle structure; alternatively, when the connecting piece 1 is provided with three or more connecting ends 11, each of the connecting ends 11 is arranged in a planar radial structure or in a spatial radial structure.

Specifically, as shown in FIGS. 1 to 8, when the connecting piece 1 has only one connecting end 11, at least one mounting base 13 is provided in the connecting end 11, at least one mounting cavity is included in the mounting base 13, and the mounting cavity is connected to a first connector 12; Alternatively, when the connecting piece 1 has only one connecting end 11, and more than two mounting bases 13 are arranged in the connecting end 11, at least one mounting cavity is respectively arranged on each of the mounting base 13, and the mounting cavity is connected with a first connector 12; alternatively, when the connecting piece 1 is provided with more than two connecting ends 11, each of the connecting ends 11 is provided with only one mounting base 13, each of the mounting bases 13 is provided with at least one mounting cavity, and the mounting cavity is connected with a first connector 12; alternatively, when the connecting piece 1 is provided with two or more connecting ends 11, and two or more mounting bases 13 are provided in each of the connecting ends 11, at least one mounting cavity is respectively provided on each of the mounting bases 13, and the mounting cavity is connected to the first connector 12.

As shown in FIGS. 1-8, the outer surface of the connecting end 11 of the connecting piece 1 is provided with an anti-slip pattern 1*d* for assisting the stable connection between the connecting end 11 and the sleeve 3; among then, at least one first fixing hole 1*e* is also provided on the connecting end 11, an installation hole 31 is provided on the sleeve 3 corresponding to the setting position of the first fixing hole 1*e*; the mounting hole 31 is connected with the first fixing hole 1*e* by matching the staple bolt 4 to further fix the sleeve 3 sleeved on the connecting end 11 to ensure the stability of the connection between the sleeve 3 and the connecting piece 1; It should be noted that the setting of the first fixing hole 1*e* is to assist in strengthening the connection between the sleeve 3 and the connecting end 11 of the connecting piece 1 and improve the stability of the connection between the sleeve 3 and the connecting end 11; and the first fixing hole 1*e* has the same effect of strengthening the stability of the connection regardless of whether the first fixing hole 1*e* is provided on the first assembled part 1*a* or the second assembled part 1*b*. Therefore, the actual installation position of the first fixing hole 1*e* can be configured according to the design requirements of the product structure, and there is not self limitation herein.

Figure 2:
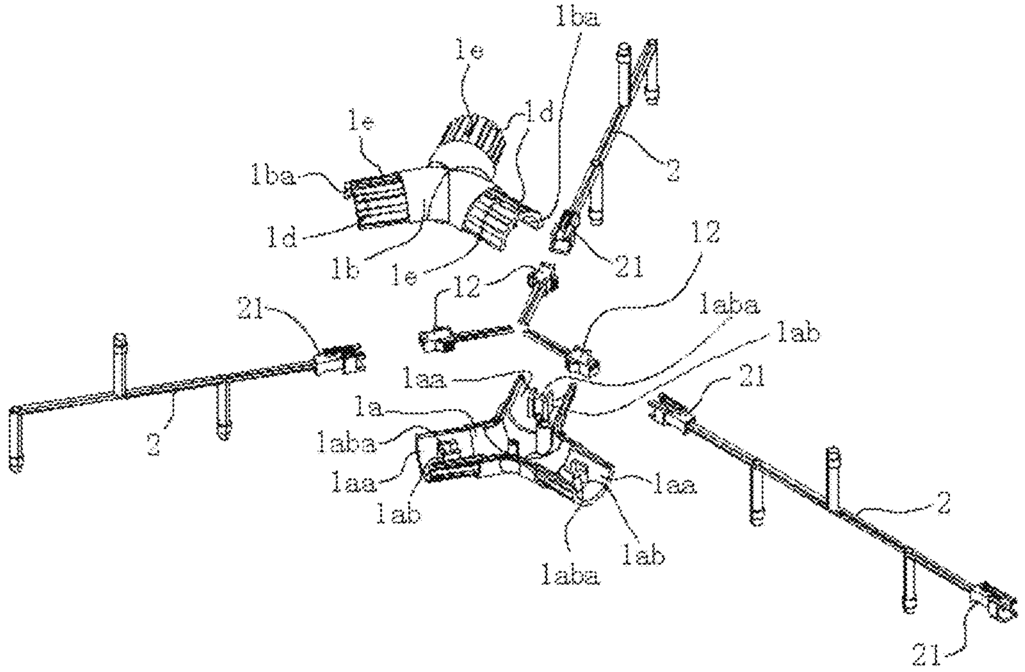
FIG. 2 is a schematic diagram of the explosive structure of another embodiment of the first connector and the second connector of the utility model.

As shown in FIGS. 1-2, when the first connector 12 is a male base structure, the second connector 21 is a female base structure matched with the first connector 12, or when the first connector 12 is a female base structure, the second connector 21 is a male base structure matched with the first connector 12; Preferably, the first connector 12 and the second connector 21 adopt an SM plug or a waterproof butt plug, and through the two types of plugs, the light string 2 and the connecting piece 1 can be stably connected, and work synchronously during operation of each light string 2 can be realized. It should be noted that the selection type of the first connector 12 and the second connector 21 can be selected according to the actual structural needs of the product and the control of the production cost of the product, and there is not self limitation herein.

Figure 9:
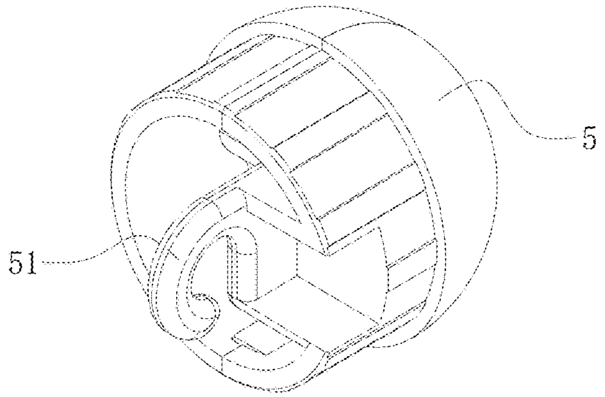
FIG. 9 is a schematic diagram of the plug structure of the utility model.
Figure 10:
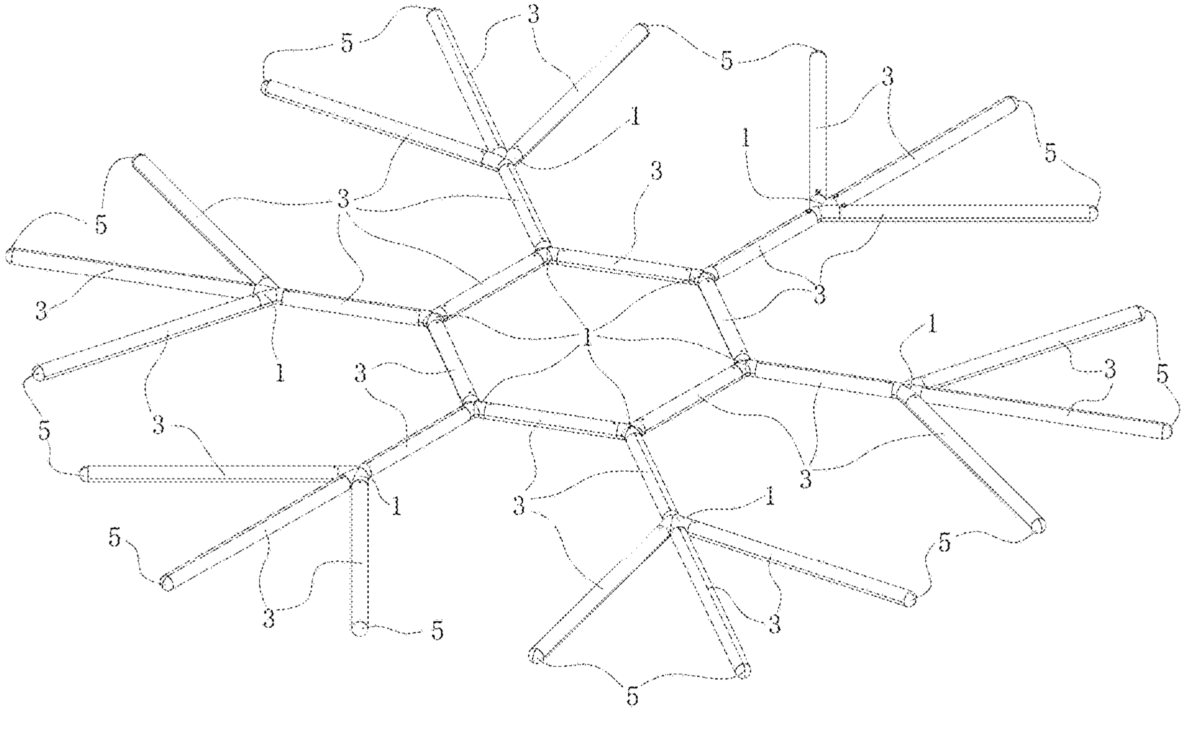
FIG. 10 is a schematic diagram of an embodiment structure of a decorative pattern of the utility model.

As shown in FIGS. 1, 9 and 10, the end of the sleeve 3 which is not connected with the connecting piece 1 is provided with a plug 5, and at least one auxiliary connecting part 51 is provided in the plug 5, and the auxiliary connecting part 51 is used to connect the end of the light string 2 which is not connected with the first connector 12; Among them, the auxiliary connecting part 51 is preferably a hook structure, through the structure, one end of the light string 2 which hangs the light string, and is not connected with the first connector 12 to support the light string 2 which is penetrated in the sleeve 3, so as to prevent one end of the light string 2 from slipping into the other end of the sleeve 3 due to not being fixed, which will affect the decorative lighting effect when the utility model is used; It should be noted that the auxiliary connecting part 51 can also be provided with a slot or a perforated structure to fix the other end of the light string 2. The specific structure of the auxiliary connecting part 51 can be configured according to the actual needs of the product structure design, and there is not self limitation here. In addition, in order to further ensure the stability of the connection between the plug 5 and the sleeve 3, a second fixing hole (not shown) may be provided at one end of the plug 5 connected to the sleeve 3, and the second fixing hole is connected to the mounting hole 31 on the sleeve 3 in conjunction with the staple bolt 4; and the plug 5 can be more stably connected to the sleeve 3 by the matching of the second fixing hole, the mounting hole 31 and the staple bolt 4.

In addition, it should be noted that the utility model also provides a connection hole (not shown) on one of the connecting pieces 1, and a power interface (not shown) is provided on the connection hole, and the power interface is electrically connected with the first connector 12 of the connecting piece 1. The power interface is electrically connected with a transformer plug (not shown) through a controller (not shown), the utility model is electrically connected with a power grid through the transformer plug, and the light emitting mode is controlled by the controller; Further, the controller can also be wirelessly connected with a remote controller (not shown), and the light emitting mode of the utility model can be adjusted by the remote controller.

When it is necessary to decorate a certain area, it only needs to first connect the second connector 21 of the light string 2 with the first connector 12 corresponding to the connecting piece 1, then sleeve 3 is sleeved on the light string 2, and one end of sleeve 3 is connected on the corresponding connecting end 11 of the connecting piece 1; and then, the sleeve 3 is fixed on the connecting end 11 by using the staple blot 4 in the corresponding mounting hole 31 and the first fixing hole 1*e*, and the connecting piece 1, the light string 2 and the sleeve 3 are assembled into a decorative pattern through such operation; When the assembled pattern is a snowflake, a star, or the like, the decorative pattern can be hung at the position where the pendant is provided, then the power interface is connected with the controller, and the transformer plug of the controller is connected to the power socket arranged in the power grid, and then the controller is turned on to make the light strings 2 electrically connected by the first connector 12 and the second connector 21 to be powered on and emit light, and the lighting mode of the light strings 2 is regulated by the controller to meet the decorative effect of users on the atmosphere of the space.

When storage is required, simply remove the controller from the utility model, then remove the staple bolts 4 at the connection between each connecting piece 1 and the sleeve 3/plug 5, remove the sleeve 3/plug 5 one by one from the corresponding connecting piece 1, and separate the second connector 21 of each light string 2 from the corresponding first connector 12 on each connecting piece 1. Separate the present utility model into modular components and neatly place them in the storage box/packaging box, so that the various components of this utility model can be easily stored; and due to the modular design of each component, the problem of the light string 2 being too long and easily tangled or even knotted, which causes inconvenience for next use, is effectively solved; Moreover, the utilization of the modular design of the utility model can greatly save storage space and effectively reduce the volume of the storage box/packaging box, which also effectively improves the space utilization rate of freight packing.

It should be noted that in the description of the present utility model, the orientation or positional relationship indicated by the terms “upper”, “lower”, “inner”, “one end”, “the other end”, “one side” or “the other side” is based on the orientation or positional relationship shown in the figures, and is only to facilitate the description of the present utility model and simplify the description, but does not indicate or imply that the referred device or element must have a specific orientation, be constructed and operated in a specific orientation, so it cannot be understood as a limitation on the utility model; Furthermore, the terms “first” and “second” are for descriptive purposes only and cannot be understood to indicate or imply relative importance; unless otherwise expressly specified and limited, the terms “mounted”, “provided”, and “connected”, etc. should be understood broadly, for example, “connected”, which may be fixed connection, or detachable connection, or integrally connected; it can be mechanical connection or electrical connection; and it can be directly connected, indirectly connected through an intermediate medium, and it can be the internal communication of two elements. For those skilled in the art, the specific meaning of the above terms in the present utility model can be understood in specific cases; In addition, the standard parts used in the utility model can be purchased from the market, if involving irregular parts, they can be customized according to the records of the description and the figures, and the specific connection mode of each part all adopts the mature conventional means such as screws/bolts, hinge locking firmware, and welding, etc. in the prior art, and the machinery, parts and equipment adopt the conventional models in the prior art, which will not be repeated here.

The above description is only a preferred embodiment of the utility model, and does not limit the scope of the utility model. Therefore, on the premise of not deviating from the design spirit of the utility model, the equivalent changes or decorations made by ordinary engineering technicians in the field on the structure, features and principles described in the utility model should fall within the scope of protection of the patent application of the utility model.

The invention claimed is:

1. A connecting assembly for a decorative light, comprising:

at least one connecting piece;

at least one light string; and at least one sleeve, wherein:

the connecting piece is provided with at least one connecting end;

the connecting end is provided with at least one first connector;

at least one end of the light string is provided with a second connector;

the second connector is electrically connected to the first connector;

the sleeve is disposed on the corresponding light string and has at least one end connected to the connecting end of the connecting piece;

the connecting piece is a cavity;

the connecting piece is provided with more than two connecting ends;

the connecting ends communicate with each other;

the connecting ends are provided with at least one mounting base;

the mounting base is connected to at least one first connector;

the connecting piece is further provided with more than two first connectors; and the first connectors are electrically interconnected.

2. The connecting assembly for a decorative light of claim 1, wherein an outer surface of the connecting end of the connecting piece is provided with an anti-slip pattern, and the anti-slip pattern is configured to secure a connection between the connecting end and the sleeve.

3. The connecting assembly for a decorative light of claim 1, wherein the second connector is a female base and the first connector is a male base which is insertable into the second connector and into mating relationship with the second connector; or the first connector is a female base and the second connector is a male base which is insertable into the first connector and into mating relationship with the first connector.

4. The connecting assembly for a decorative light of claim 1, wherein one end of the sleeve not connected to the connecting piece is provided with a plug, the plug is provided with at least one auxiliary connecting part, and one end of the light string not connected to the first connector is connected to the auxiliary connecting part.

* * * * *